UNITED STATES PATENT OFFICE.

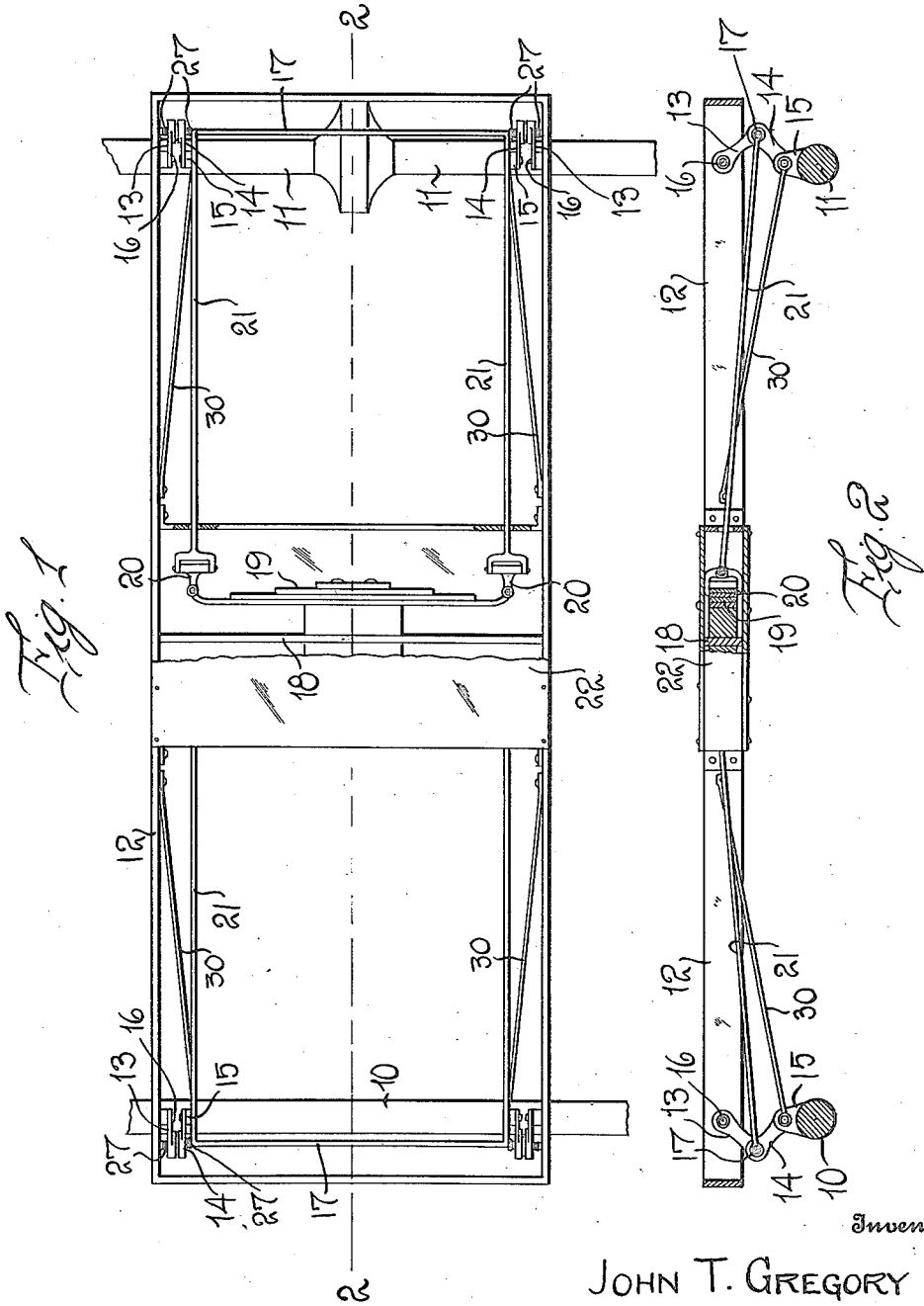

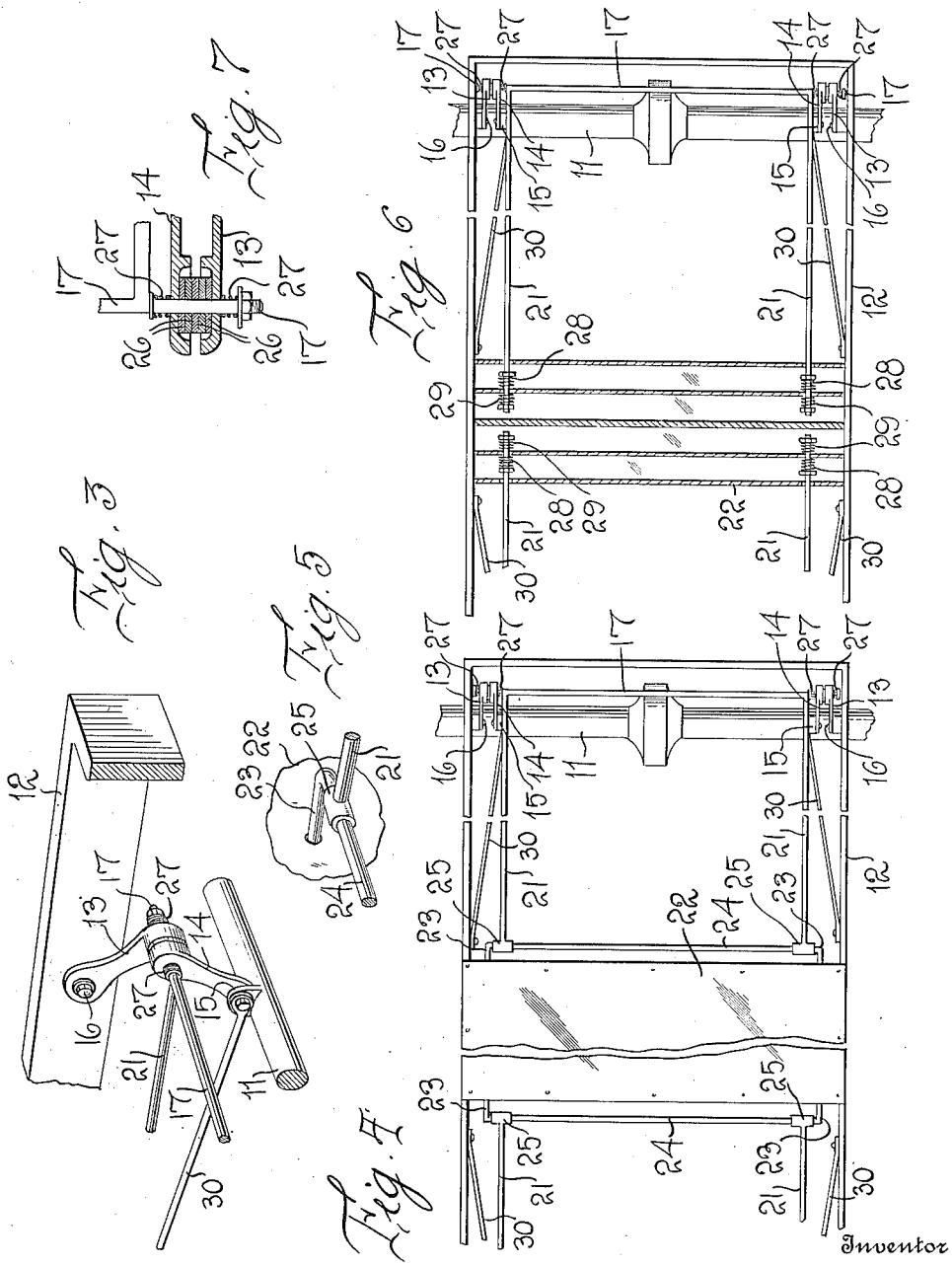

JOHN T. GREGORY, OF CHAPMAN QUARRIES, PENNSYLVANIA.

SPRING SYSTEM FOR VEHICLES.

1,232,680.

Specification of Letters Patent. Patented July 10, 1917.

Application filed December 18, 1916. Serial No. 137,669.

*To all whom it may concern:*

Be it known that I, JOHN T. GREGORY, a citizen of the United States, residing at Chapman Quarries, in the county of Northampton and State of Pennsylvania, have invented certain new and useful Improvements in Spring Systems for Vehicles of which the following is a specification, reference being had to the accompanying drawings.

This invention relates to automobiles or other vehicles and particularly to the spring systems whereby the body of the vehicle is supported upon the axles. The ordinary springs as used on automobiles and other vehicles are disposed adjacent the axles and the wheels and as a consequence water and mud is splashed from the wheels upon the springs and dust collects upon the springs, thus causing the springs to rust, wear and to squeak. Furthermore the springs are so disposed that the oil on the spring very soon evaporates and leaves the spring dry which causes squeaking of the springs. If the springs were protected they would remain lubricated a relatively long while and dust, dirt and water would not collect upon the springs.

The general object of my invention is to provide a spring system for vehicles in which the springs are located at a distance from the axle and in which the springs are inclosed so that they are fully protected and housed, thus permitting the springs to be more perfectly lubricated and preventing sedimentary matter from collecting between the leaves of the spring.

A further object of the invention is to so construct the spring system that toggle links are used between the body of the vehicle and the chassis, the springs or other shock cushioning devices being arranged at any desired distance from the axles, being completely housed, and being connected to the toggle links.

Other objects will appear in the course of the following description.

My invention is illustrated in the accompanying drawings, wherein, Figure 1 is a top plan view of the chassis of an automobile partly broken away showing the spring system;

Fig. 2 is a section on the line 2—2 of Fig. 1, one-half of the housing 22 being shown in elevation;

Fig. 3 is a fragmentary perspective view of one end of the chassis showing one of the toggle links and its connections;

Fig. 4 is a fragmentary top plan view similar to Fig. 1 showing a modified form of connection between the rods 21 and the springs;

Fig. 5 is a fragmentary perspective view of the parts 24 and 25 and 21;

Fig. 6 is a top plan view partly in section of a like construction to that shown in Fig. 1, showing another form of spring; and Fig. 7 is a fragmentary section through the meeting ends of the toggle levers 13 and 14.

Referring to these figures, it will be seen that between the front and rear axles 10 and 11 respectively and the chassis or frame 12 I dispose the toggle links 13 and 14. There are two pairs of these toggle links 13 and 14 at each end of the vehicle, the lower toggle links 14 being pivotally connected to a lug 15 extending upward from the axle and the upper toggle links being pivotally connected to the side bars of the chassis in any suitable manner as by bolts 16. The toggle links overlap each other at their adjacent ends and are pivotally connected to each other by a bolt 17 in a manner which will be later stated. Disposed in any convenient position, as for instance at the middle of the vehicle, is a cross bar 18 which is cruciform in shape and supported at the center of this cross bar is a laterally extending spring 19 which in Fig. 1 is shown as a leaf spring. The ends of this spring are connected each to a shackle 20 and to this shackle is operatively connected a rod 21 which extends to the corresponding bolt 17 connecting the toggles. In Fig. 2 I have shown these toggles as normally extending downward and rearward so that upon a relative depression of the body of the vehicle, the meeting ends of the toggle links 13 and 14 will be forced rearward, thus drawing upon the rods 21 and flexing the spring. The rods 21 project out through a casing 22 or housing which entirely incloses the front and rear springs 19 and in Fig. 4 I show a modification of the construction shown in Fig. 1 wherein the springs are connected by shackles at their ends to rods 23 which extend outward through openings in the housing 22 and then extend crosswise or transversely as at 24, the rods 21 having sleeves 25 at their ends engaging over these rods. It is of course to be understood that the front springs are the same as the rear springs.

Preferably the overlapping ends of the toggle links 13 and 14 will be provided with shock absorbing disks 26, (see Fig. 7.) These shock absorbing disks may be made alternately of steel and asbestos. They are mounted upon the bolt 17 and the two toggle links are urged toward each other to thus provide for frictional contact between the disks 26 by means of springs 27. By adjusting the nuts on the bolts 17, frictional engagement between these shock absorbing disks may be increased or diminished.

While I have illustrated in Figs. 1 and 2 the springs as being leaf springs which extend transversely of the chassis, it will be understood that coil springs might be used in place of leaf springs and further it will be obvious that these may be compression springs operating to resist an inward movement of the meeting ends of the toggle links. In Fig. 6 I show a construction in which two coil springs are used, yieldingly resisting movement of the toggle links in either direction. The toggle links are the same as heretofore described and, therefore, have the same reference numeral but the springs are designated respectively 28 and 29. While I have illustrated these springs as being disposed so as to flex in a horizontal plane, it will be obvious that they might be made to flex in a vertical plane without departing from the spirit of the invention. Preferably and in order to secure good and firm engagement between the axles and the frame, the axles of the vehicle are connected to the frame by means of braces 30 so that no pulling strain is exerted upon the toggle links but that they are free to move into various angular relations under variations in the load.

The operation of the invention is obvious from what has gone before. When the vehicle runs over an obstacle, the axle and body will of course have relative movement, the body moving relatively downward and the axle moving upward. This causes the meeting ends of the toggle links, in the construction shown in Fig. 2 to move rearward, drawing upon the rods 21 and flexing the springs. The rebound will be checked by the friction disks disposed between the toggle links. With this construction the springs can be placed in almost any position with regard to the vehicle and may be placed either horizontally or vertically. Furthermore the casing or housing 22 may be made oil or dust proof and packed with grease, thus doing away with the squeak so annoying in the springs now in use in automobiles. Furthermore, this grease packed in the case with the springs would cushion the springs and do away with all sudden movements of the springs and this grease itself would act as a shock absorber preventing undue rebound of the springs.

While I have illustrated certain details of my construction which I believe to be particularly effective, I wish it understood that the mechanism may be modified in many ways without departing from the spirit of the invention.

Having described my invention, what I claim is:

1. In a vehicle, an axle, a chassis, a transversely extending leaf spring mounted upon the chassis and supported at its middle, but having its extremities free to flex, knuckles pivotally connected to the extremities of the leaf spring, rods pivotally connected to the knuckles for movement in a plane at right angles to the pivotal connection of the knuckles with the spring, and levers operatively connecting the chassis to the axle but permitting relative movement of the chassis and axle, said rods being connected to said levers.

2. In a vehicle, a front and rear axle, a chassis, a plurality of toggle links pivotally connected to each other and to the chassis and the front and rear axles, a pair of transversely extending leaf springs disposed at the middle of the chassis, the springs being supported at their middle portions and having their extremities free to flex, rods operatively connected to the ends of each spring and extending from said springs to the adjacent toggle links and engaging the mutually pivoted ends of the toggle links, and draft rods pivoted to the chassis and extending and pivoted to the corresponding axle.

3. In a vehicle, an axle, a chassis, toggle links pivoted to each other and pivotally connected to the axle and to the chassis, friction disks disposed between the overlapping ends of the toggle links and resisting rotation of the toggle links relative to each other, a connecting rod operatively connected to the mutually pivoted ends of the toggle links, and a spring to which the connecting rod is operatively connected and resisting movement of the toggle links.

4. In a vehicle, an axle, a chassis, a pair of lower toggle links pivotally connected to the axle, a pair of upper toggle links pivotally connected to the chassis, the upper ends of the lower toggle links overlapping the lower ends of the upper toggle links, bolts passing through the connected ends of each pair of toggle links, friction disks loosely mounted upon each bolt and disposed between said overlapping portions of the toggle links and the springs on the bolt and urging said friction disks into operative engagement, springs mounted upon the body of the vehicle remote from the axle, and connecting rods operatively connected at one end to the springs and at their other ends operatively connected each to the upper and lower toggle links.

In testimony whereof I hereunto affix my signature in the presence of two witnesses.

JOHN T. GREGORY.

Witnesses:
    EARLE H. CHAPMAN,
    SAMUEL RADCLIFFE.